(12) United States Patent
Kiler

(10) Patent No.: US 8,253,262 B1
(45) Date of Patent: Aug. 28, 2012

(54) AUTOMOTIVE WIND POWERED GENERATOR SYSTEM

(76) Inventor: Timothy W. Kiler, Lake Worth, FL (US)

( * ) Notice: Subject to any disclaimer, the term of this patent is extended or adjusted under 35 U.S.C. 154(b) by 0 days.

(21) Appl. No.: 12/978,074

(22) Filed: Dec. 23, 2010

Related U.S. Application Data (63) Continuation-in-part of application No. 12/283,345, filed on Sep. 10, 2008, now Pat. No. 8,067,846.

(51) Int. Cl.
*F03D 9/00* (2006.01)
*H02P 9/04* (2006.01)

(52) U.S. Cl. ............................................. 290/44; 290/55
(58) Field of Classification Search ............... 290/44, 290/55; 415/2.1, 4.1, 4.2, 4.3, 4.5, 3.1, 121.3; 180/2.1, 2.2, 165, 65.3, 65.31; 322/1; 416/55
See application file for complete search history.

(56) References Cited

U.S. PATENT DOCUMENTS

| | | | |
|---|---|---|---|
| 3,876,925 A | 4/1975 | Stoeckert | 322/1 |
| 4,424,452 A | 1/1984 | Francis | 290/53 |
| 5,287,004 A * | 2/1994 | Finley | 290/55 |
| D374,656 S | 10/1996 | Richardson | D13/115 |
| 5,725,062 A | 3/1998 | Fronek | 180/2.2 |
| 5,920,127 A | 7/1999 | Damron et al. | 290/44 |
| 6,409,467 B1 | 6/2002 | Gutterman | 415/4.3 |
| 6,423,894 B1 | 7/2002 | Patz et al. | 136/244 |
| 6,838,782 B2 | 1/2005 | Vu | 290/55 |
| 7,135,786 B1 | 11/2006 | Deets | 290/55 |
| 7,434,636 B2 | 10/2008 | Sutherland | 180/2.2 |
| 7,652,389 B2 * | 1/2010 | Farmer | 290/55 |
| 2003/0057707 A1 | 3/2003 | Wu | 290/55 |
| 2005/0098361 A1 | 5/2005 | Mitchell | 180/2.2 |
| 2006/0278445 A1* | 12/2006 | Chang | 180/2.2 |
| 2007/0107949 A1 | 5/2007 | Bradley et al. | 180/2.2 |
| 2008/0202825 A1 | 8/2008 | Kerish | 180/2.2 |
| 2011/0031043 A1* | 2/2011 | Armani et al. | 180/2.2 |

* cited by examiner

*Primary Examiner* — Julio Gonzalez
(74) *Attorney, Agent, or Firm* — Robert C. Kain, Jr.

(57) ABSTRACT

The Wind Powered Generator System is a combination of many common automotive parts. Automotive wind power is a new area and incorporates as a secondary layered roof. The air velocity or wind turns the fun blade when either vehicle is in motion or not, producing an electrical current.

5 Claims, 10 Drawing Sheets

FIG.1

FRONT FAN

FIG.2

ELECTRICAL FLOW CHART

FIG. 4

BASIC POWER CONTROL MODULE

FIG.5

BASIC BATTERY OR POWER CELL

FIG.9

MOUNTING BRACKET ASSEMBLY TO PRIMARY ROOF

AUTOMOTIVE WIND POWERED GENERATOR SYSTEM

This is a continuation in part patent application based upon pending application Ser. No. 12/283,345, filed Sep. 10, 2008 now U.S. Pat. No. 8,067,846, the contents of which is incorporated herein by reference thereto.

BACKGROUND AND FIELD

The present disclosure pertains to an automotive wind powered generator system.

DESCRIPTION OF RELATED ART

Several automotive generators, power control module, battery and or cell All of these components are parts of automotive vehicles.

The above mentioned components provide a power source for generating electric current.

BRIEF DESCRIPTION OF THE FIGURES

The present invention is illustrated by way of illustrations of components or parts and by drawings. Further objects and advantages of the present invention are found in the detailed description of the embodiments and the further specification set forth below. Similar numerals designate similar items throughout the drawings.

DETAILED DESCRIPTION

The following description provides an automotive wind powered generator system. In the following description, numerous specific details are set forth in order to provide a more thorough understanding of the present invention.

The present invention is an electrical re-charging station for hybrid or electric vehicles which contain a battery or electric cell encased in a secondary roof panel. The purpose is to have an electric producing generator-motor sets consistently re-charging the battery or cell while the vehicle is in motion or in "park" position when the wind travels through the respective cowling over the generator fan. A metal alloy fan blade (FIG. 1) placed on the rotor shaft or hub of the generator will turn clockwise with the assistance of air velocity or wind, thus producing an electrical current. The benefit is that the generator system will produce an electric current that will increase the possible range of the vehicle if the vehicle is an electric powered vehicle. It will also charge enough voltage to reduce the amount for "At Home" charging from utilities for electric powered vehicles.

The components necessary to assemble this system consist of a number of generators 201 (FIG. 10), a power control unit (FIG. 4) and a secondary roof panel (see roof panel sections 101, 102 in FIG. 6) located on the top of the existing primary roof (see roof 205 in FIG. 7) of the automobile. Secondary roof panel 101, 102 is made of sheet metal. The secondary roof is divided in two sections, forward section A and rear section B. The forward section (section A) is bisected into left and right portions 101 A and 102 A extends aft of the front windshield approximately eight inches from the top of the windshield. The forward section 101 A, 102 A, is also raised approximately two inches to allow water (or fluids) to drain from side to side. The forward section is divided (bisected) from front to rear in a 'V' groove 105 to provide stabilization and preventing the metal panels to 'waffle' or distort. The forward section A is welded on each side and the 'V' groove 105 is bolted to the primary roof structure (roof 105, FIG. 7) to solidify the complete stabilization and preventing detachment. The purpose of the forward section A is to create a wind tunnel environment. The aero velocity entering is increased by a 'Venturi Effect' and compression.

The rear or aft section (Section B) houses the Generators 201. Secondary roof section B has a forward or front end 309 and a rear end 310. See FIG. 6. The rear section is movable housing that lifts up for maintenance or removal of Generators. See FIG. 7. The points of attachment 106 are aft on the Section B and are hinge elements on each rear corner of the primary roof with mounting pins or swivel pins. See FIG. 11 for the hinge pins. The front or forward end 309 of the Section B has two latches 210, strap style, see FIG. 8, to lock into the forward section A. When locked, the Section B is generally aligned with Section A thereby permitting undisturbed air flow over the sections. On each lateral side of the back of the rear section B are stabilizer fins or rudders 220, 222 (FIG. 6) to provide stabilization of vehicle in high wind or high speed of vehicle. See FIG. 12. At the top and rear 310 of section B is an adjustable spoiler 120 that incorporates a high mounted stop light 130. See FIG. 12. These two components are essential to prevent a 'lifting', 'wobbling' or an unsafe operation of vehicle. Located on the back of section B are louvers 330—FIG. 12 that raise or close due to aero velocity. Each louver is mounted with a pin on each side, creating a 'swivel' motion to open or close. Returning to FIG. 7, safety cables 140 are placed on each side from section B to primary roof to prevent blow off of the section B during high vehicle speeds. The Generators are mounted on the rear section of the primary roof. See FIG. 10. The generator brackets 150 (FIGS. 9 and 10) retain the generators side to side and are bolted onto the primary roof. There is a bracket for the front of the generator and a bracket for the rear of each generator (see brackets 150a, 150b in FIG. 10). Each generator is placed on its specific bracket and a saddle or horseshoe shaped clamp 150, see FIG. 9, is attached on top of each generator. The clamps are bolted down on the front and rear bracket. The purpose of these clamps is to insure in collision impact or rollover that the generators remain in place.

Figure 1:
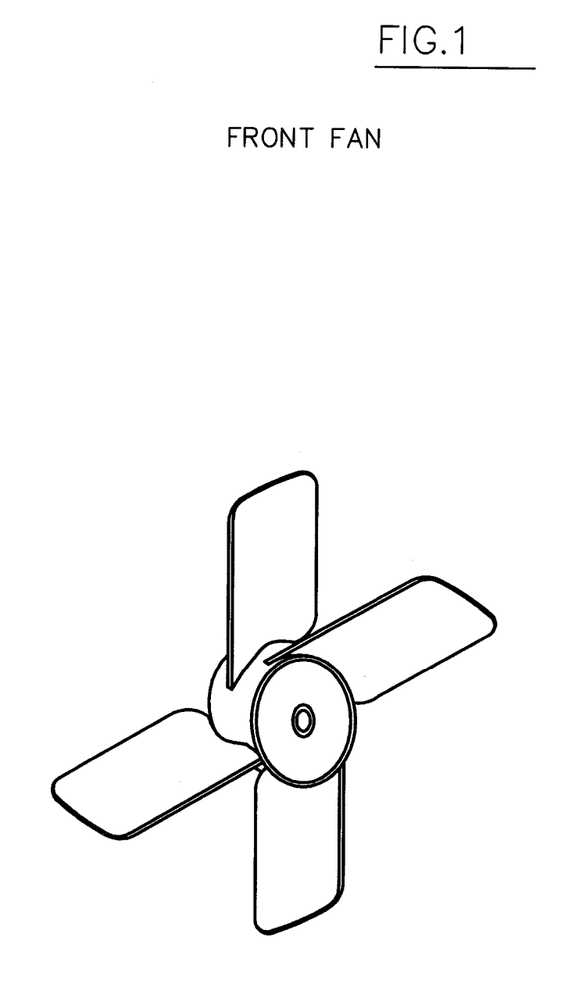
FIG. 1 illustrates the fan blade used on the front of generator unit.

FIG. 1 illustrates the fan blade on the front of generator unit, This fan blade is a five blade metal alloy or aluminum component. It is attached to the front of the generator and turns with aero velocity to create electrical to create electrical current.

Figure 2:
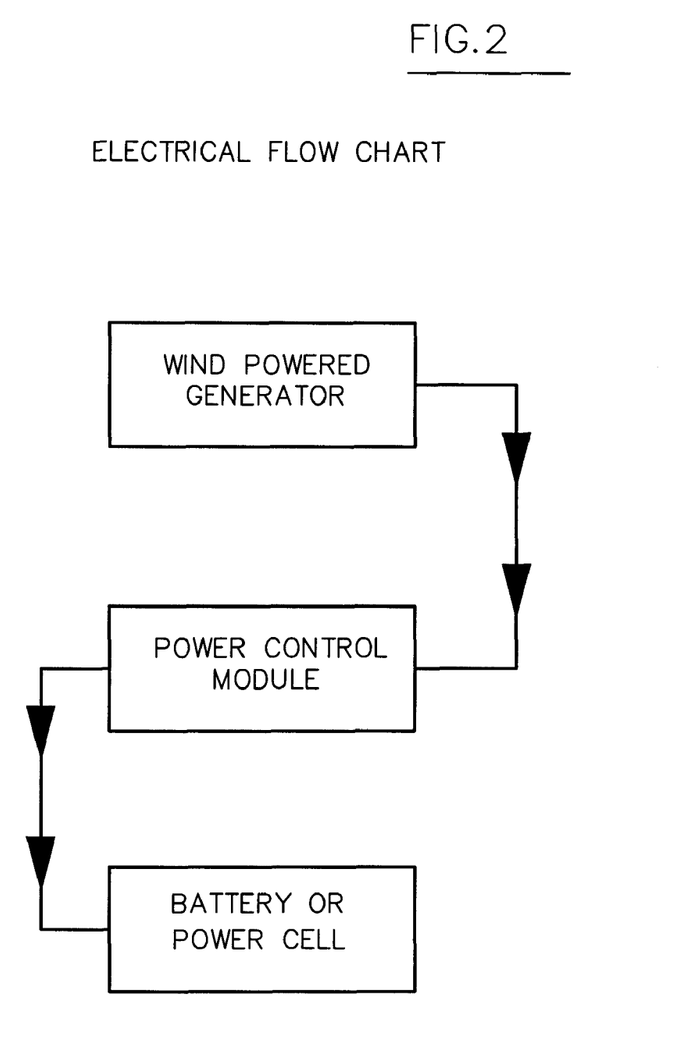
FIG. 2 illustrates a flow chart of the interconnections of components.

FIG. 2 illustrates the flow chart, of the interconnection of components. From generator system to power control module to battery or cell. Also, the system is all integrated with a wiring harness.

Figure 3:
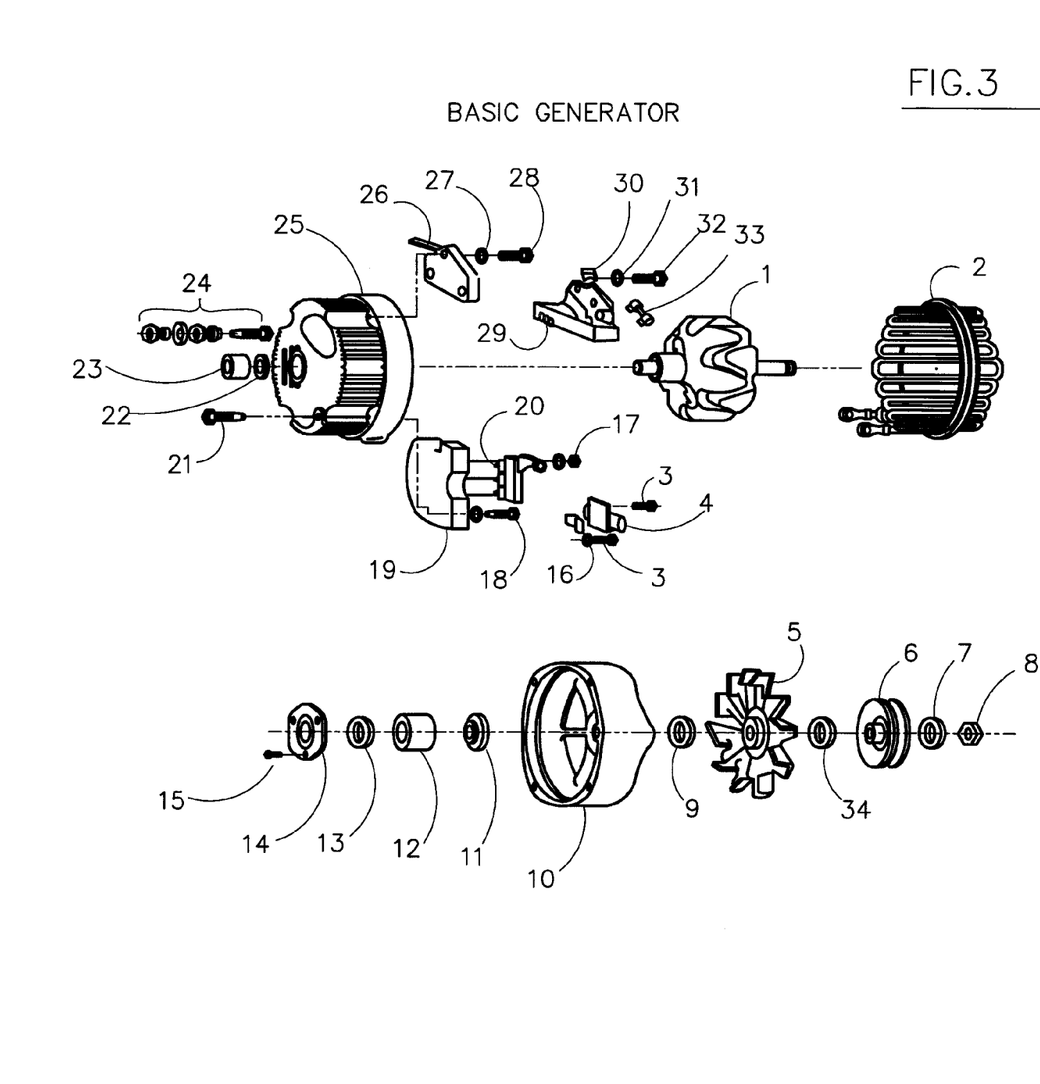
FIG. 3 illustrates a basic breakdown diagram of a generator.

FIG. 3 illustrates a breakdown diagram of a basic generator. This diagram encompasses all components of an "Internal Voltage Regulator" style generator. There are generators with an "External Voltage Regulator". Depending upon usage of system, required voltage, and other variables, both styles could be used. The listing of the part numbers is on the "Generator Components Sheet". The Generators used are modified for more amperage or voltage. The increased amount is based on the maximum voltage requirement or minimum voltage requirement of vehicle. The amount of generators on the vehicle will vary from model or car line depending on MVR.

Figure 4:
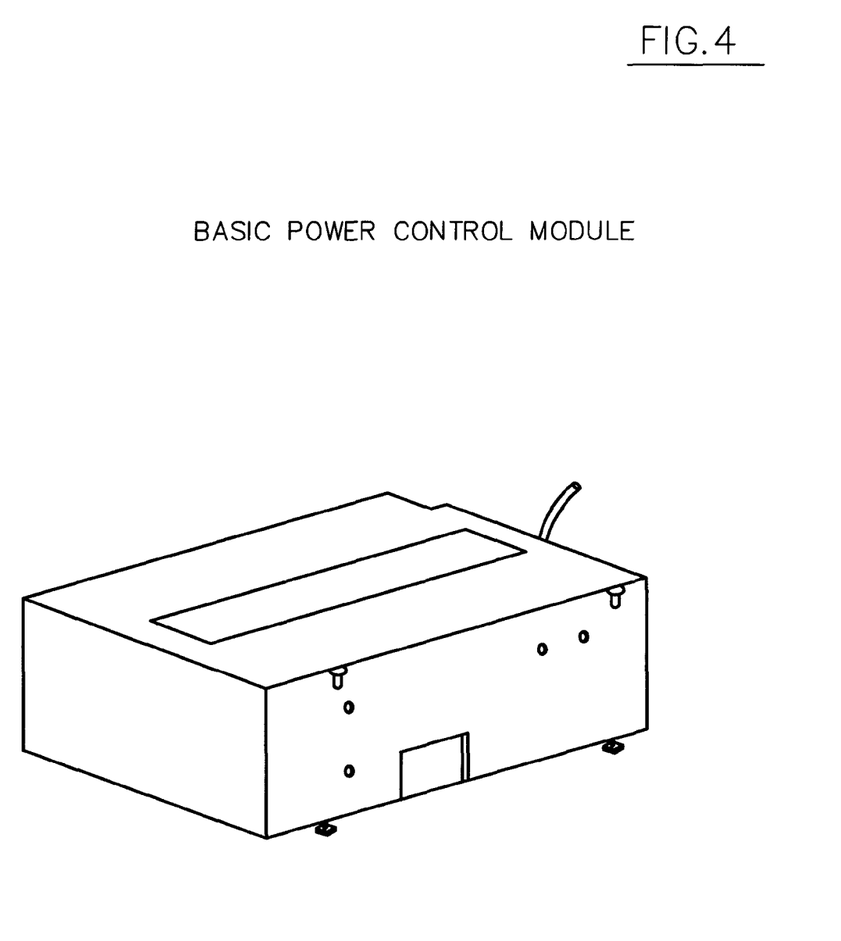
FIG. 4 illustrates a basic Power Control Module.

FIG. 4 illustrates a basic Power Control Module. As many control modules of today, they are programmable. This module serves as a regulator, inverter, or emergency cut-off. The module controls the input of current to the battery or cell by regulating the output of the generators. This module controls the maximum voltage requirement. If the generators used for the system are not for a 12 Volt system, it also serves as an inverter to 12 Volts or more. The system can be operated directly from generator system to battery or cell, but in vehicles of the day, there are too many variables not to have sonic sort of control module.

Figure 5:
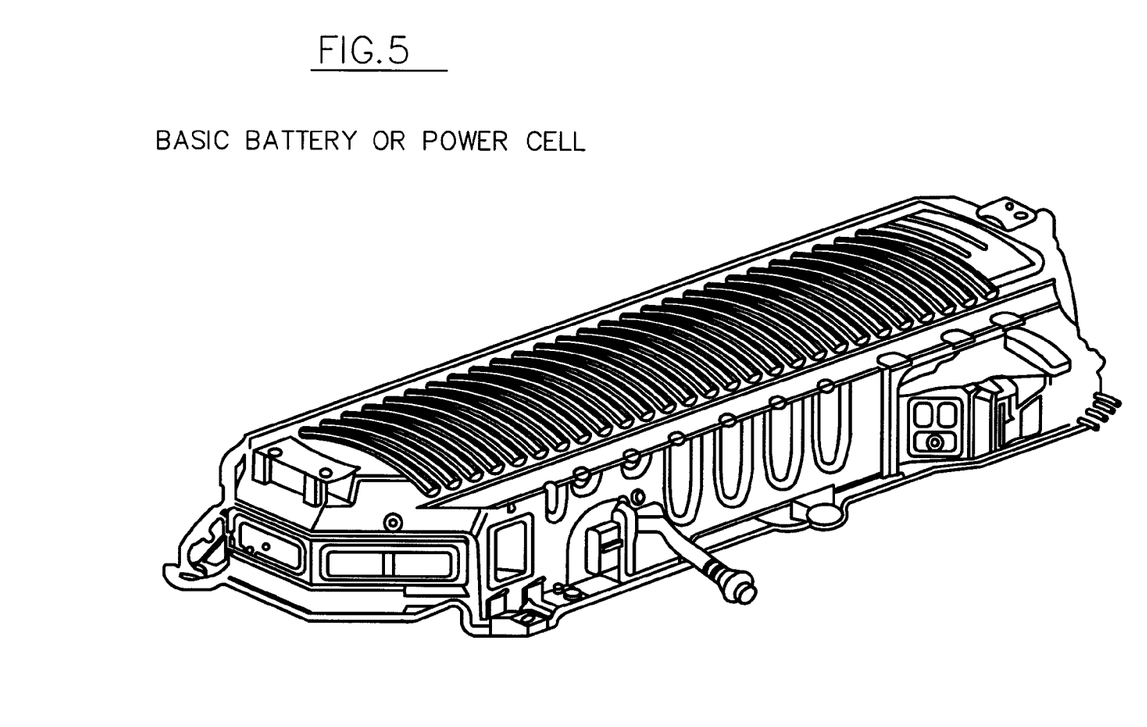
FIG. 5 illustrates a basic Battery or Electronic Cell.

FIG. 5 illustrates a basic battery or cell. There are many different electric cells, including lithium power cells. Some are called batteries; some are called electric power cells.

Figure 6:
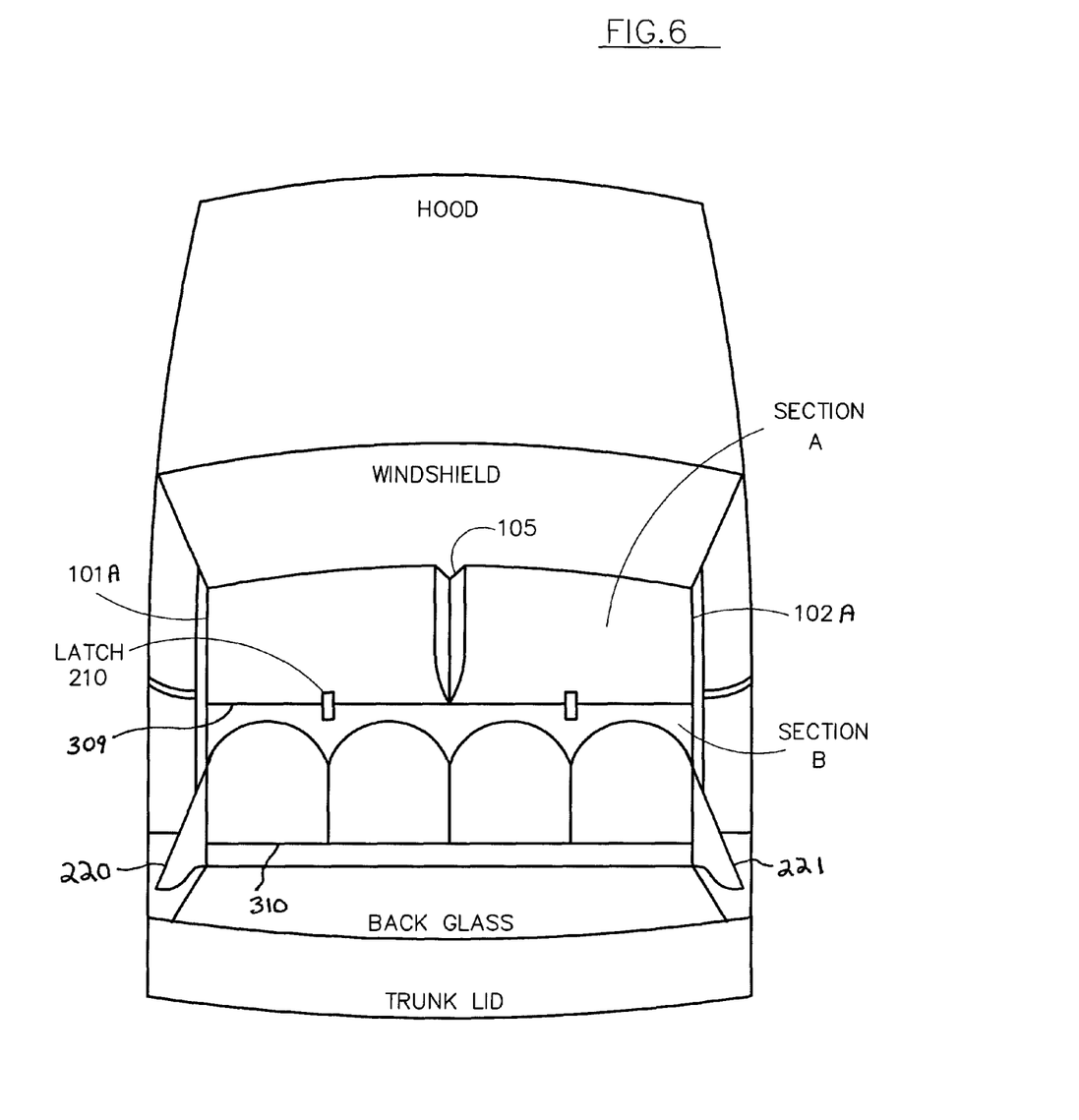
FIG. 6 illustrates an overhead view of vehicle showing the forward section A of the wind cowling and the raisable aft section B covering the wind driven generators.

FIG. 6 illustrates an overhead view of vehicle. Section A and Section B are located on top of the primary roof. Section A serves as an intake and wind tunnel. Section B serves as a generator housing and enclosure.

Figure 7:
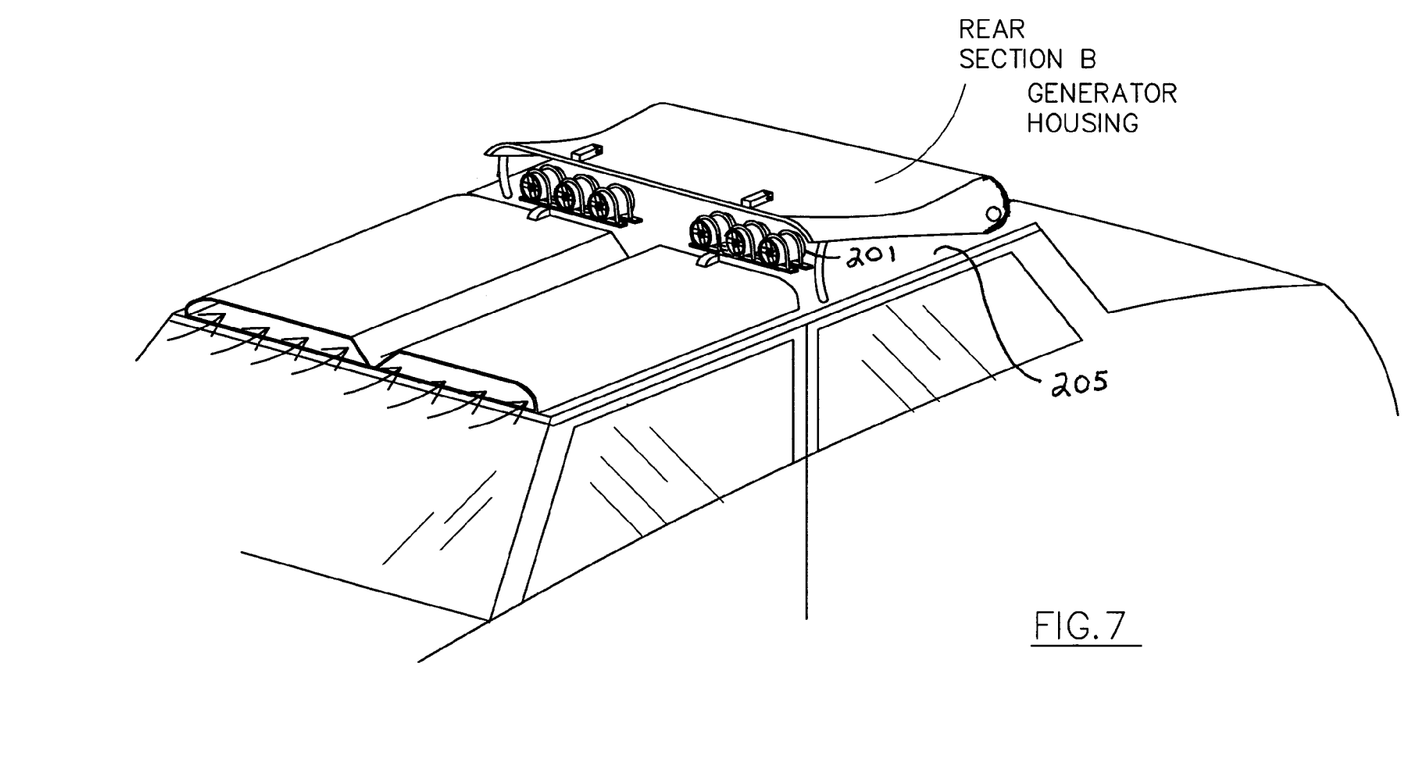
FIG. 7 illustrates aft Section 13 as a moveable portion and generator housing.

FIG. 7 illustrates Section B as a moveable portion and generator housing. Cables retain section from blow off. This section pivots open for routine maintenance and repairs.

Figure 8:
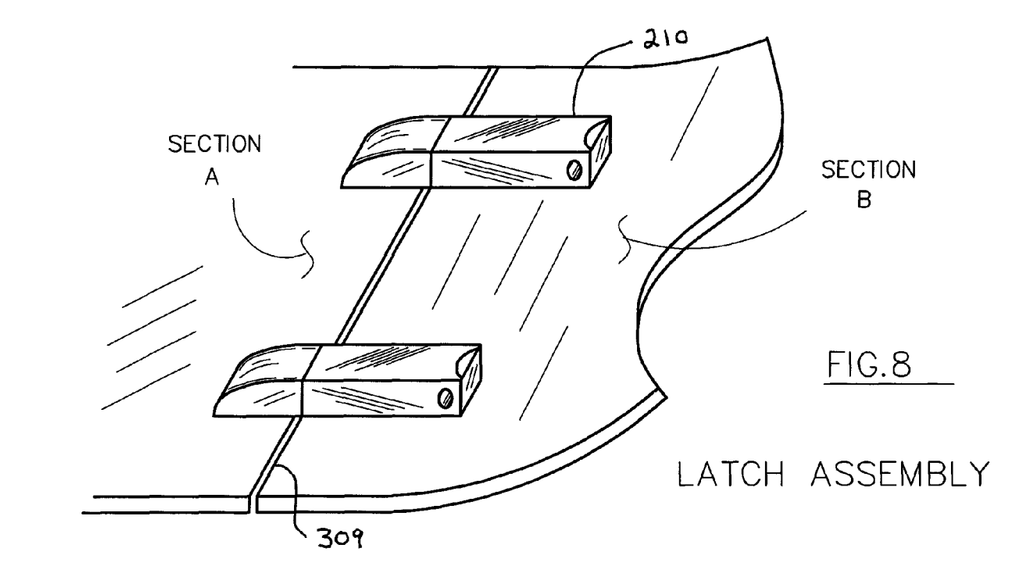
FIG. 8 illustrates the two latch mechanisms 210 which secure the forward section A to the aft section B. See also FIG. 6.
Figure 9:
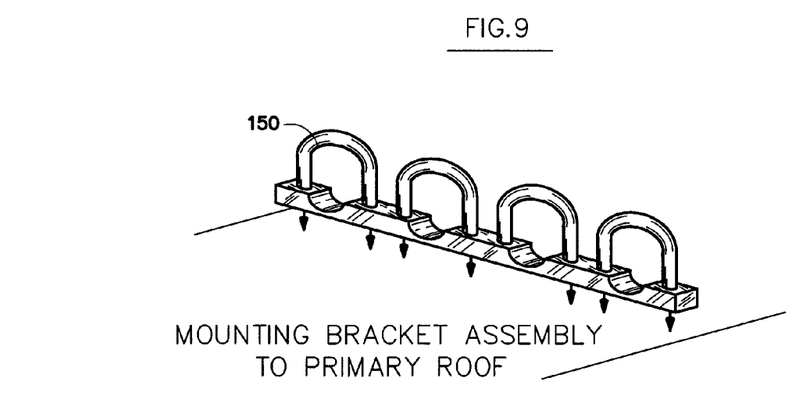
FIG. 9 illustrates the generator mounting brackets which mount the generators to the primary roof of the vehicle.

FIG. 8 illustrates the two latch mechanisms. These latches retain Section A to Section B for secure enclosure.

FIG. 9 illustrates the generator mounting bracket. The bracket is bolted down through the primary roof. Saddle clamps are used to secure generators to bracket. This insures non-movement in collision or roll-over.

Figure 10:
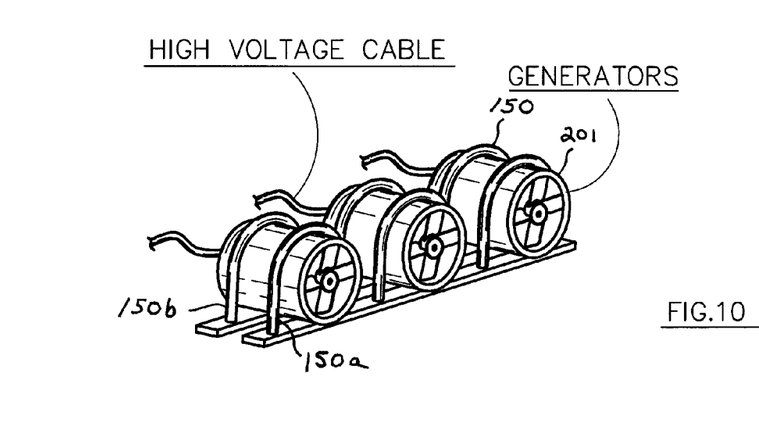
FIG. 10 illustrates the generator system mounted on primary roof. The horseshoe clamps are also shown.

FIG. 10 illustrates the generator system mounted on the primary roof. High voltage cables lead down to power control module or regulator.

Figure 11:
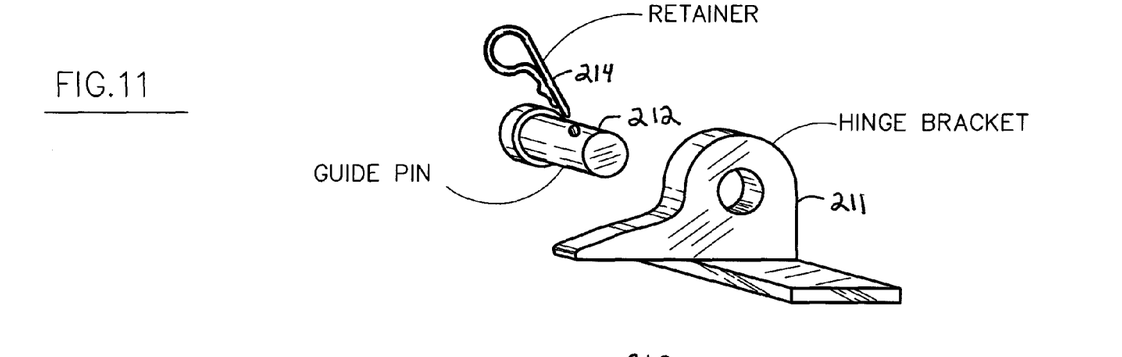
FIG. 11 illustrates the hinge brackets located on bottom-aft and rear of Section The hinge permits the Section B to be raised by the operator.

FIG. 11 illustrates the hinge brackets 211 located on bottom and rear of Section B. A guide pin 212 and retainer 214 are used as a pivot point and can be removed to detach Section B from the primary roof.

Figure 12:
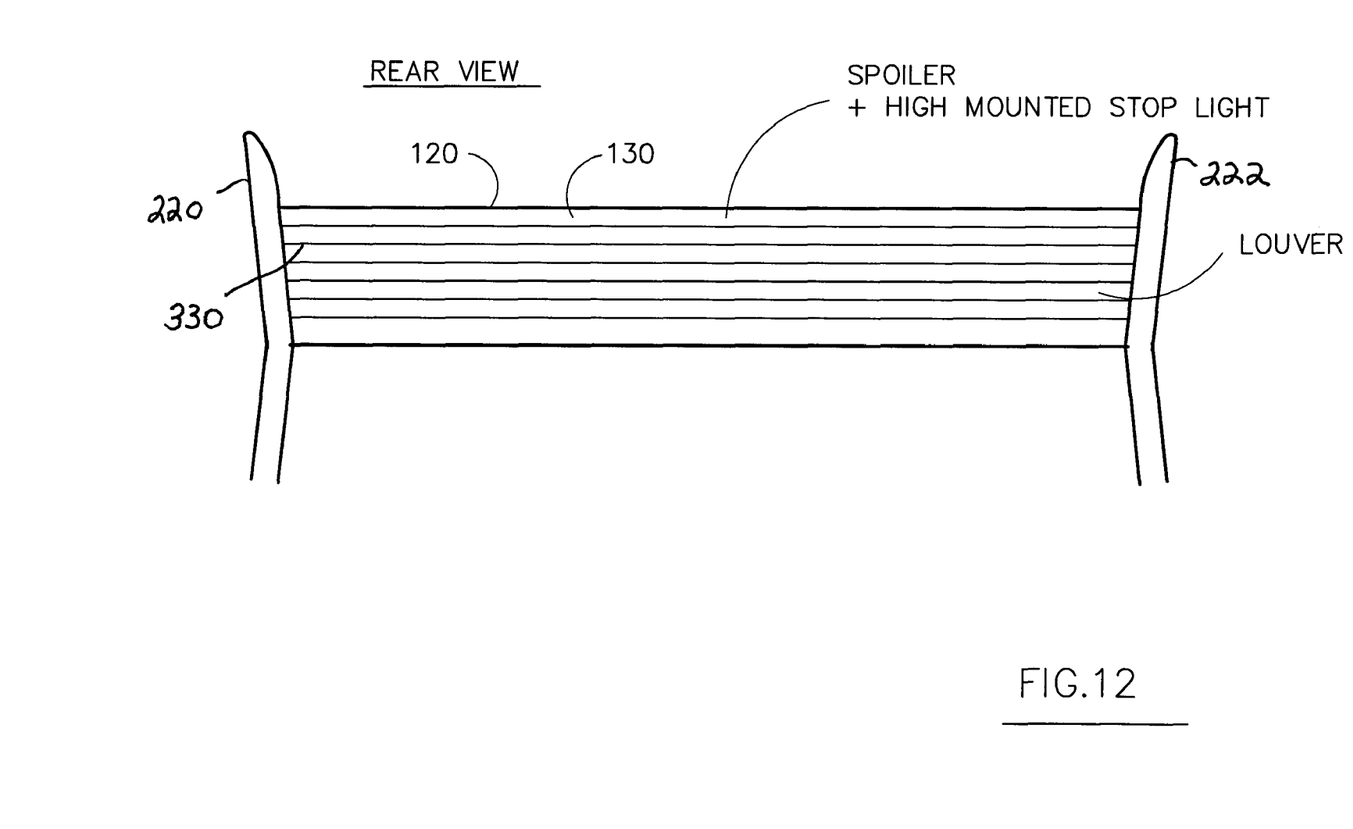
FIG. 12 illustrates the rear view of Section B.

FIG. 12 illustrates the rear view of Section B. The louvers arc horizontal from side to side. The spoiler and high mounted stop light are mounted on top of the louver section.

ADDITIONAL SPECIFICATIONS

The Wind Powered Generator System is a charge and recharging system for Hybrid or Electric vehicles. The system charges the battery or electric cell by air velocity or wind. The system charges while the vehicle is in motion or in a Park position. As the vehicle moves forward, the fan blade turns the generators rotor with the wind creating an electrical current.

GENERATOR COMPONENT TABLE

1. Rotor
2. Stator
3. Screw
4. Capacitor
5. Fan
6. Pulley
10. Frame
11. Slinger
12. Bearing
13. Collar
14. Plate
15. Screw
16. Washer
17. Nut
18. Screw
19. Rectifier
20. Diode Trio
21. Bolt
22. Seal
23. Bearing
24. Terminal
25. Frame
26. Regulator
27. Washer
28. Screw
29. Spring
30. Brush
31. Washer

What is claimed is:

1. A wind powered generating system mounted on a primary roof of a hybrid or an electric powered automotive vehicle having batteries or electric cells comprising:
   a secondary roof having a forward section and an aft section mounted atop the roof of said automobile, said forward section spaced above said primary roof and defining a wind tunnel therebetween;
   the secondary roof aft section having a forward end segment and rearward aft end segment, the secondary roof aft section being partly rotatably attached to said roof near said rearward aft end segment and having a lift open position and a closed operational position, wherein in said closed operational position, both said forward and aft section define an elongated wind tunnel with said automobile roof;
   generators mounted between the aft section of the secondary roof and the automobile roof and within said elongated wind tunnel;
   wherein air velocity within said elongated wind tunnel causes respective fans attached to corresponding generators to rotate the generators to produce electric current for the batteries or electric cells; and
   including a latch for locking said forward and aft secondary roof sections together.

2. A wind powered generating system as claimed in claim 1 wherein said forward secondary roof section includes a rearwardly running stabilizing shallow groove thereon.

3. A wind powered generating system as claimed in claim 1 including one or more elevated louvers near the rearward aft end segment of the aft secondary roof section.

4. A wind powered generating system as claimed in claim 1 wherein said forward secondary roof section includes a rearwardly running stabilizing shallow groove thereon attached to said primary roof.

5. A wind powered generating system as claimed in claim 4 including one or more elevated louvers near the rearward aft end segment of the aft secondary roof section.

* * * * *